United States Patent [19]

Ferrero

[11] 3,911,155

[45] Oct. 7, 1975

[54] METHOD FOR DECORATING RAW DOUGHS OF CONFECTIONARY PRODUCTS TO BE BAKED

[76] Inventor: Aldo Ferrero, Via Ampere 9, Milan, Italy, 20131

[22] Filed: Feb. 5, 1973

[21] Appl. No.: 329,305

[30] Foreign Application Priority Data
Feb. 10, 1972 Italy.................................. 20457/72

[52] U.S. Cl.................................. 426/296; 426/94
[51] Int. Cl.² ........................................... A21D 8/02
[58] Field of Search ........... 426/289, 296, 152, 292, 426/295, 96, 103, 141, 94

[56] References Cited
UNITED STATES PATENTS 3,761,281   9/1973   Ferrero .............................. 426/558
3,767,823   10/1973   Wheeler ............................. 426/296

OTHER PUBLICATIONS

Berolzheimer, Ruth, Ed., The Cookie Book, Con. Bk. Pub., Chicago, Ill., 1952, pp. 9, 23, 35, 38 and 40.

Family Circle Library of Cooking, Vol. 5, Rockville House Pub. Inc., Rockville Cen., N.Y., pp. 561, 565, 593 and 603.

*Primary Examiner*—Jeanette M. Hunter

[57] ABSTRACT

Decorating the surface of raw alimentary doughs with small granules of puffed cereals covered with a layer of coloured sugar, then baking to obtain a baked product on which the coloured small granules are fully incorporated in said baked product, and retain the form and colour thereof prior to baking.

2 Claims, No Drawings

METHOD FOR DECORATING RAW DOUGHS OF CONFECTIONARY PRODUCTS TO BE BAKED

This invention relates to a method for decorating raw doughs of confectionary products to be baked, and more particularly a method by which it is possible to obtain baked sweets provided with a surface decoration, particularly of a white colour.

It is well known that since long ago the present art, as specifically related to white colour decoration in the form of small granule for raw doughs of sweets and biscuits to be baked, has resorted to the use of granulated sugar because of associating a sufficiently white colour, such as to meet the user's decorative demands, with a reasonable price.

Granulated sugar is used since other decorative white small granule elements, exhibiting the property of withstanding the baking heat without burning or browning, or however without impairing their white colour which should be unchanged on the sweet surface after removal from the oven, have not been available heretofore.

All of the alimentary products as small granules being used for surface decoration of raw doughs either are of a colour different from white (e.g. hazel-nut granules, peanut granules, etc.), or have a white ivory colour (such as peeled-almond granules, but as the product on which they are scattered for decorating purposes is removed from the oven, the colour thereof is changed, taking the well known colour feature of a toasted product, and this due to the small granule conversion occurring because of the oven heat when baking a sweet on which the small granule has been used.

There are white-coloured decorative elements (macaroons) being used only for decorating confectionary products previously baked, or not requiring any baking. In order to adher to a surface to be decorated, such elements should find the latter at a sticky, or better at a creamy state, so that they can be retained thereon. Thus, the use is excluded for all the confectionary products, such as leavened products, biscuits, requiring for the feature thereof to be decorated prior to baking. The surface of these raw doughs is soft, as not yet settled by the baking effect, with resulting crust formation, and therefore such a decorative element as a small granule can readily adher on the raw dough. At the next baking step, the dough will leaven and this will be sufficient for the small granule to be attached to the surface, and on removing the confectionary product from the oven, said decorative small granule will be quite adhering to the confectionary product surface.

However, the granulated sugar being as above stated commonly used at present for the above described purpose, suffers from two significant disadvantages:

due to its physical characteristic, it is often disagreeable to mastication since sugar is a crystalline product: many persons do not like to have under their teeth which is frequently not tolerated by old persons;

it has the property of absorbing the humidity of the confectionary product, on the surface of which it has been scattered for decorative purpose. This is a common matter in oven confectionary products containing a substantial humidity percentage, as well as every soft leavened oven confectionary products. As a result, granulated sugar gets soft syrupy and hence sticky, such to reach in some cases a sugar inversion and also evento lose its characteristic form and white colour. This disadvantage is accompanied by more serious disadvantages, sometimes such as the mustiness on the surface of a sweet decorated with granulated sugar, or in the best of situations the formation of a sticky gluey crust of the oven confectionary product with an objectionable appearance.

For example, let us consider the "Italian Eastern Cake". This oven confectionary product is comprised of a major soft leavened portion, which is surface decorated with a "macaroon coating paste" which in turn is decorated with granulated sugar of a quite large size. Such as "display" is conventional. The granulated sugar becomes impregnated with the humidity in the soft leavened portion, having a high humidity percentage. It is to be noted that this product is wrapped up in polyethylene, or cellophane or oil-paper to prevent the confectionary product humidity from evaporating in order to retain as long as possible a softy state as a freshness sign. This is a necessary requirement, particularly for the industrail type of production starting a few months before the oven confectionary product is eaten, and this because of a timely delivery to product retailers.

The wrapping, which is almost impervious, not only highly facilitates humidity absorption by the granulated sugar, but often contributes to build up the musty state due to failed "breathing" of the wrapping. Where mould is not built up because the process is carried out in an environment sufficiently protected from musty spores, the phenomenon of the macaroon paste gluing to the wrapping is however still caused, resulting upon eating the baked sweet in an unpleasant display because on removal the wrapping peels off some softish dampish crust layer.

However, the impending mould phenomenon is highly dreaded, and often inhibits the achievement of these decorated oven confectionary products in oversea or tropical countries.

It is the main object of the present invention to provide a method enabling to decorate any type of raw doughs of oven confectionary products, and hence biscuits as well, with a coloured granule, particularly white coloured granule, capable of withstanding the high temperature in a oven without getting burned or bleached.

It is another object of the invention to provide a coloured granule, particularly a white coloured granule, for decorating raw doughs of confectionary products to be baked, which is soft to mastication, while being sweet, and does not lose its characteristic form and melt even when impregnated with humidity, and finally capable of avoiding the risk of mould building up, of course where this would be caused by humidity alteration, in the granulated sugar absorbing and retaining humidity on the surface of a baked confectionary product.

According to the method of the present invention, on the surface of raw doughs for confectionary products to be baked, a decoration is provided, as comprising puffed cereal granules covered with a coloured sugar layer, these granules being to the surface of the confectionary products to be baked prior to baking thereof, thereupon being firmly incorporated in the surface of such decorated products, and retaining unaltered the original form and colour thereof.

Thus, it was surprisingly found that puffed cereal granules then covered with a coloured sugar layer, after scattering on a confectionary product to be baked, when subjected to baking up to a temperature of about 200°–250°C, retain unaltered the original form and colour thereof without the coloured sugar coating thereof melting in the presence of humidity of the oven confectionary product after baking, or thereto conferring a crystalline hardness similar to that of the granulated sugar.

For a better understanding of the invention, some examples are now given for tipical embodiments of the method, which examples however are not to be intended in a limiting sense.

EXAMPLE 1

Starting from a raw granule of a cereal capable of expanding by puffing, puffed cereals are provided. Particularly suitable materials are white coloured granules, such as those of rice, maize, tapioca, sago, etc. The granule is expanded by puffing, or the known process of cooking at a high temperature and pressure a cereal to explosion thereof for puffing or swelling.

Of course, expansion could be also carried out on intergral or crushed cereal and after puffing mechanically making it into granule of a desired size.

After obtaining the puffed granule, a selection is accomplished by suitable sieving in order to remove lumps and granules of a size different from the preselected size.

Separately, the sugar is coloured, for instance to a yellow colour, as allowed by foods and drug law.

To this end 2 or 3 g. alimentary yellow colour are dissolved in about 100 g. water. This yellow-coloured liquid solution is poured on about 1.250 kg. refined sugar to impart it a yellow colour. The sugar and colour are mixed by rotary motion in a proper cylinder or drum fitted with movable blades. The sugar mass can be heated, although this process is not essential. When sugar is evenly yellow-coloured, 1 kg. puffed rice granule is poured thereon, or vice versa, and the whole is thoroughly mixed, suitably heating the mass. Due to heat, a thin layer of coloured sugar is provided and encloses the puffed rice granule.

Then, this coloured sugared granule is dried in order to be crisp and pleasant to mastication.

This granule of a yellow colour exhibits the feature of being pleasant to mastication, surface used on raw doughs of confectionary products to be baked, without changing in colour, or bleaching or burning upon baking.

Therefore, the above granule can be used in a wide range of baked confectionary products, as a decoration thereof, which application was never provided heretofore.

EXAMPLE 2

Assume to decorate a baked confectionary product with a sweet granule of white colour.

In this case, the same procedure is followed as in Example 1, that is to say a white colour, as allowed by foods and drug law, is dissolved in a syrup consisting of sugar dissolved in hot water, so as to reach a density of about 20–30 Bé. Then, 500 g. of this sugar syrup are taken, dissolving therein about 10–20 g. white colour. Thus, the sugar syrup will take a white colour.

Separately, and in a suitable container, about 2 kg. refined sugar are placed and thereon the white-coloured sugar syrup is poured. The sugar will be allowed to mix with the syrup for the required time that the colour will thoroughly mix with sugar.

Next, about 3 kg. puffed rice granule are poured on this coloured sugar, or vice versa, and, by suitably heating the container wherein this mass is placed, the same is mixed for the required time that the sugar adheres to the surface of the puffed granule.

The product is then dried only to make crisper the granule and hence more pleasant to a user.

Also in this case, the puffed cereal granule will fully withstand the sweet baking on the surface of which it has been scattered for decorative purposes, retaining its colour without alteration and thus perfectly replacing the granulated sugar causing the above described disadvantages.

What I claim is:

1. A method for decorating the surface of raw doughs of confectionary products to be baked, comprising the steps of:

providing a granule of previously puffed cereal;

covering said granule while heating with a layer of colored sugar; and applying the covered granule to the surface of raw confectionary products prior to baking and baking the same; whereby the granule is fully incorporated into the surface of the product, retaining unaltered its original color and form.

2. A method as claimed in claim 1, wherein the colored sugar covering the puffed cereal granule comprises an almost anhydrous product.

* * * * *